(12) United States Patent
Russell

(10) Patent No.: US 9,237,274 B2
(45) Date of Patent: Jan. 12, 2016

(54) REDUCTION OF GLARE IN AUGMENTED REALITY

(71) Applicant: EMPIRE TECHNOLOGY DEVELOPMENT LLC, Wilmington, DE (US)

(72) Inventor: Jake Armstrong Russell, Bellevue, WA (US)

(73) Assignee: Empire Technology Development LLC, Wilmington, DE (US)

(*) Notice: Subject to any disclaimer, the term of this patent is extended or adjusted under 35 U.S.C. 154(b) by 0 days.

(21) Appl. No.: 14/364,017

(22) PCT Filed: Nov. 14, 2013

(86) PCT No.: PCT/US2013/070028
§ 371 (c)(1),
(2) Date: Jun. 9, 2014

(87) PCT Pub. No.: WO2015/072997
PCT Pub. Date: May 21, 2015

(65) Prior Publication Data
US 2015/0206347 A1    Jul. 23, 2015

(51) Int. Cl.
*H04N 5/232* (2006.01)
*H04N 5/225* (2006.01)
(Continued)

(52) U.S. Cl.
CPC ......... *H04N 5/23293* (2013.01); *H04N 5/2257* (2013.01); *H04N 5/23229* (2013.01); *G02B 2027/014* (2013.01); *G02B 2027/0138* (2013.01); *G02B 2027/0178* (2013.01); *G09G 3/003* (2013.01); *G09G 2340/14* (2013.01);
(Continued)

(58) Field of Classification Search
None
See application file for complete search history.

(56) References Cited

U.S. PATENT DOCUMENTS 2,969,428 A    1/1961    Wittlig
7,292,281 B2   11/2007   Cheng
(Continued)

FOREIGN PATENT DOCUMENTS

WO    2012042821 A1    4/2012

OTHER PUBLICATIONS

McGuire et al., Practical, Real-time Studio Matting using Dual Imagers, 2006, The Eurographics Association, Eurographics Symposium on Rendering.*

(Continued)

*Primary Examiner* — Justin P Misleh
(74) *Attorney, Agent, or Firm* — Moritt Hock & Hamroff LLP; Steven S. Rubin, Esq.

(57) ABSTRACT

Technologies are generally described for methods and systems effective to reduce glare in augmented reality. In some examples, a method for producing a modified image of an object may include receiving first image data. The first image data may correspond to a first light reflected from the object through a clear filter. The method may further include receiving second image data. The second image data may correspond to a second light reflected from the object through a polarized filter. The method may further include combining the first image data and the second image data to generate modified image data. The method may further include producing the modified image of the object based on the modified image data. The method may further include rendering the modified image on an augmented reality display. The modified image may be different from the first image and different from the second image.

21 Claims, 9 Drawing Sheets

(51) Int. Cl.
 *G02B 27/01* (2006.01)
 *G09G 3/00* (2006.01)
(52) U.S. Cl.
 CPC ........ *G09G 2360/144* (2013.01); *H04N 5/2254* (2013.01)

(56) References Cited

U.S. PATENT DOCUMENTS

| | | | |
|---|---|---|---|
| 7,522,748 | B2 | 4/2009 | Kondo et al. |
| 7,729,607 | B2 | 6/2010 | Karim |
| 7,760,962 | B2 | 7/2010 | Sambongi et al. |
| 7,813,541 | B2 | 10/2010 | Sali et al. |
| 8,120,831 | B2 | 2/2012 | Qian |
| 8,410,974 | B2 | 4/2013 | Kojima |
| 2002/0172432 | A1* | 11/2002 | Pilu et al. .................. 382/274 |
| 2003/0184671 | A1 | 10/2003 | Robins et al. |
| 2007/0280669 | A1* | 12/2007 | Karim .......................... 396/155 |
| 2010/0102211 | A1 | 4/2010 | Murooka et al. |
| 2010/0157082 | A1* | 6/2010 | Katerberg .................. 348/222.1 |
| 2011/0211047 | A1* | 9/2011 | Chhibber et al. .............. 348/47 |
| 2011/0287811 | A1 | 11/2011 | Mattila et al. |
| 2012/0042821 | A1 | 2/2012 | Moody |
| 2012/0075513 | A1* | 3/2012 | Chipman et al. .............. 348/302 |
| 2012/0229681 | A1* | 9/2012 | Ansfield et al. .............. 348/241 |
| 2013/0127980 | A1 | 5/2013 | Haddick et al. |
| 2013/0208028 | A1* | 8/2013 | Shirai et al. .................. 345/690 |

OTHER PUBLICATIONS

"Polarizer: Another must have filter!," Accessed at http://www.adidap.com/2008/03/20/polarizer-another-must-have-filter/, accessed on May 28, 2014, 11 pages.

Mann, S. et al., "Realtime HDR (High Dynamic Range) Video for Eyetap Wearable Computers, FPGA-Based Seeing Aids, and Glasseyes (Eyetaps)," 25th IEEE Canadian Conference on Electrical and Computer Engineering (CCECE), 2012, 6 pages.

International Search Report for International Application No. PCT/US2013/70028, mailed on Mar. 19, 2014, 13 pages.

* cited by examiner

800 A computer program product.

802 A signal bearing medium.

804

At least one of
    one or more instructions for a method for producing a modified image of an object; or
    one or more instructions for receiving first image data, wherein the first image data corresponds to a first light reflected from the object through a clear filter, and wherein the first image data, when rendered on an augmented reality display, produces a first image; or
    one or more instructions for receiving second image data, wherein the second image data corresponds to a second light reflected from the object through a polarized filter and wherein the second image data, when rendered on the augmented reality display, produces a second image; or
    one or more instructions for combining the first image data and the second image data to generate modified image data, wherein the modified image data corresponds to the object; or
    one or more instructions for producing the modified image of the object based on the modified image data; or
    one or more instructions for rendering the modified image on the augmented reality display, wherein the modified image is different from the first image and different from the second image.

| 806 A computer readable medium | 808 A recordable medium | 810 A communications medium |

Fig. 8

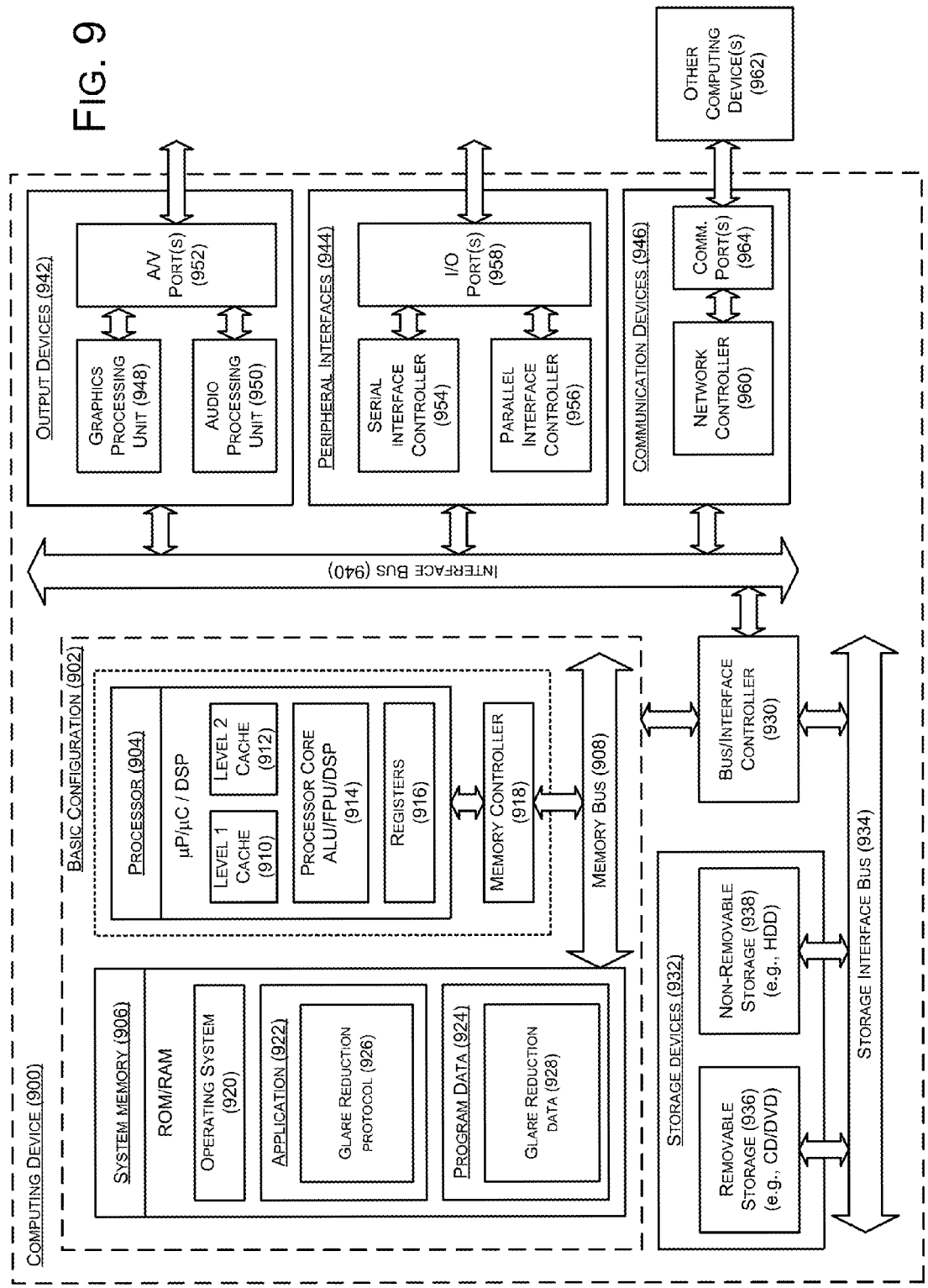

REDUCTION OF GLARE IN AUGMENTED REALITY

CROSS REFERENCE TO RELATED APPLICATIONS

This application is a U.S. National Stage filing under 35 U.S.C. §371 of International Application No. PCT/US13/70028 filed on Nov. 14, 2013. The disclosure of the International Application is hereby incorporated by reference in its entirety.

BACKGROUND

Unless otherwise indicated herein, the materials described in this section are not prior art to the claims in this application and are not admitted to be prior art by inclusion in this section.

A wearable device may be in a form of eyeglasses. The wearable device may include one or more augmented reality displays. The augmented reality displays may be positioned near the eyes of a user wearing the wearable device. The augmented reality displays may be configured to be in communication with a processor and may display content to the user. In some examples, each augmented reality display may be further configured to be in communication with additional devices such as a camera.

SUMMARY

In some examples, methods for producing a modified image of an object are generally described. The methods may include receiving first image data. The first image data may correspond to a first light reflected from the object through a clear filter. The first image data, when rendered on an augmented reality display, may produce a first image. The methods may further include receiving second image data. The second image data may correspond to a second light reflected from the object through a polarized filter. The second image data, when rendered on the augmented reality display, may produce a second image. The methods may further include combining the first image data and the second image data to generate modified image data. The modified image data may correspond to the object. The methods may further include producing the modified image of the object based on the modified image data. The methods may further include rendering the modified image on the augmented reality display. The modified image may be different from the first image and different from the second image.

In some examples, devices effective to produce a modified image of an object are generally described. The devices may include a memory that includes instructions. The devices may further include an augmented reality display. The devices may include a processor configured to be in communication with the memory and the augmented reality display. The processor may be effective to receive first image data. The first image data may correspond to a first light reflected from the object through a clear filter. The first image data, when rendered on the augmented reality display, may produce a first image. The processor may be further effective to store the first image data in the memory. The processor may be further effective to receive second image data. The second image data may correspond to a second light reflected from the object through a polarized filter. The second image data, when rendered on the augmented reality display, may produce a second image. The processor may be further effective to store the second image data in the memory. The processor may be further effective to combine, with use of the instructions, the first image data and the second image data to generate modified image data. The modified image data may correspond to the object. The processor may be further effective to produce the modified image of the object based on the modified image data. The processor may be further effective to render the modified image on the augmented reality display. The modified image may be different from the first image and different from the second image.

In some examples, an augmented reality glasses device effective to produce a modified image of an object is generally described. The augmented reality glasses device may include a camera that includes a lens. The augmented reality glasses device may further include a memory that includes instructions. The augmented reality glasses device may further include an augmented reality display. The augmented reality glasses device may further include a processor configured to be in communication with the camera, the memory and the augmented reality display. The processor may be effective to receive first image data. The first image data may correspond to a first light reflected from the object. The first image data may be received by the camera through a clear filter. The first image data, when rendered on an augmented reality display, may produce a first image. The processor may be further effective to store the first image data in the memory. The processor may be further effective to receive second image data. The second image data may correspond to a second light reflected from the object. The second image data may be received by the camera through a polarized filter. The second image data, when rendered on the augmented reality display, may produce a second image. The processor may be further effective to store the second image data in the memory. The processor may be further effective to combine, with use of the instructions, the first image data and the second image data to generate modified image data. The modified image data may correspond to the object. The processor may be further effective to produce the modified image of the object based on the modified image data. The processor may be further effective to render the modified image on the augmented reality display. The modified image may be different from the first image and different from the second image.

In some example, methods for producing a modified image of an object, are generally described. The methods may include, by a processor, receiving first image data. The first image data may correspond to a first light reflected from the object through a first polarized filter. The first polarized filter may be oriented to a first polarizing angle. The first image data, when rendered on an augmented reality display may produce a first image. The methods may also include receiving second image data. The second image data may correspond to a second light reflected from the object through a second polarized filter. The second polarized filter may be oriented to a second polarizing angle. The second polarizing angle may be different from the first polarizing angle. The second image data, when rendered on the augmented reality display may produce a second image. The methods may also include combining the first image data and the second image data to generate modified image data. The modified image data may correspond to the object. The methods may also include producing the modified image of the object based on the modified image data. The methods may also include rendering the modified image on the augmented reality display. The modified image may be different from the first image and different from the second image.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 8 illustrates an example computer program product that can be utilized to implement reduction of glare in augmented reality; and FIG. 9 is a block diagram illustrating an example computing device that is arranged to implement reduction of glare in augmented reality, all arranged according to at least some embodiments described herein.

DETAILED DESCRIPTION

Figure 1:
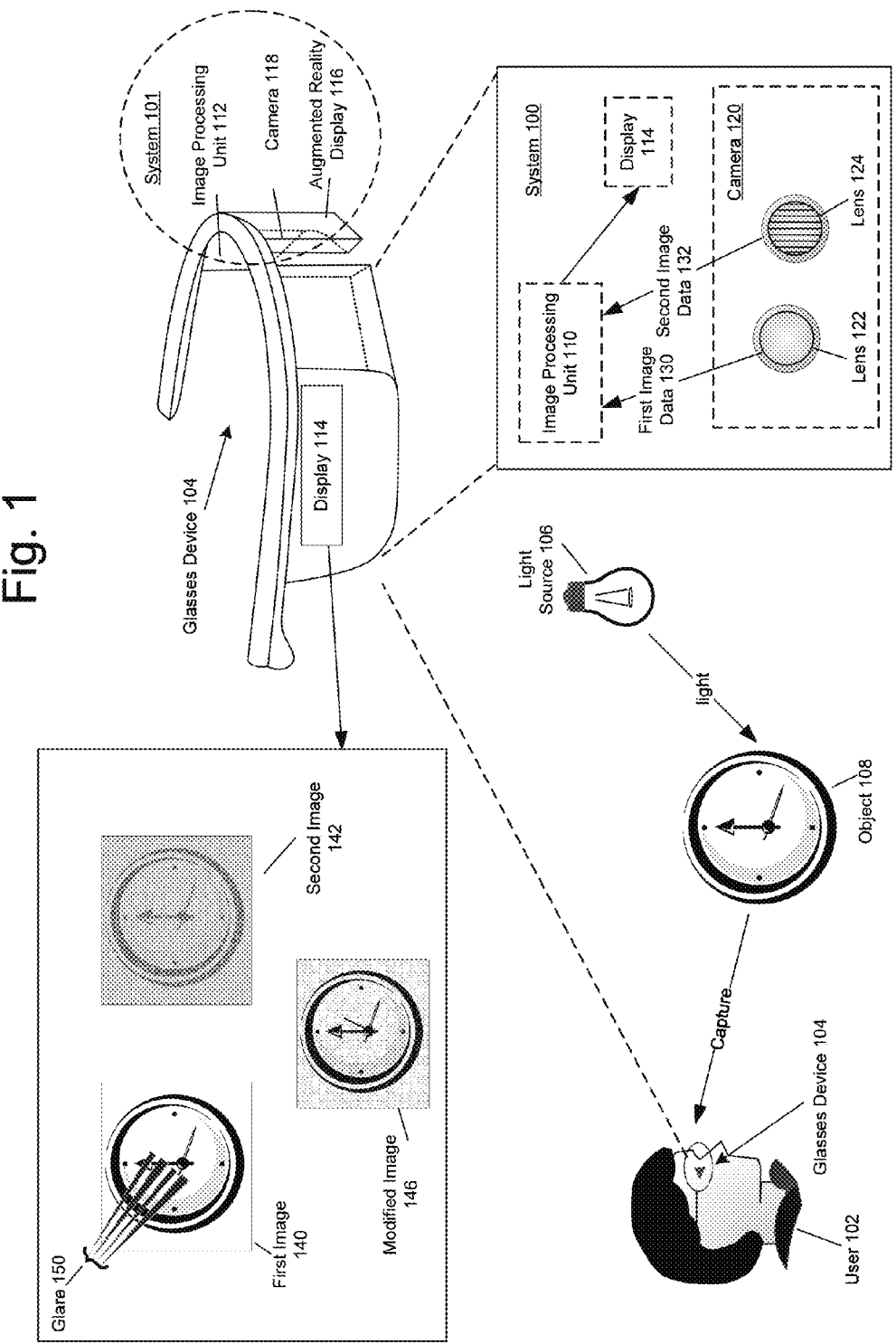
FIG. 1 illustrates an example system that can be utilized to implement reduction of glare in augmented reality.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to reduction of glare in augmented reality.

Briefly stated, technologies are generally described for methods and systems effective to reduce glare in augmented reality. In some examples, a method for producing a modified image of an object may include receiving first image data. The first image data may correspond to a first light reflected from the object through a clear filter. The method may further include receiving second image data. The second image data may correspond to a second light reflected from the object through a polarized filter. The method may further include combining the first image data and the second image data to generate modified image data. The method may further include producing the modified image of the object based on the modified image data. The method may further include rendering the modified image on an augmented reality display. The modified image may be different from the first image and different from the second image.

FIG. 1 illustrates an example system 100 that can be utilized to implement reduction of glare in augmented reality, arranged in accordance with at least some embodiments described herein. System 100 may be implemented in a glasses device 104. System 100 may include an image processing unit 110, an augmented reality display ("display") 114, and/or at least one camera 120. Glasses device 104 may be an augmented reality glasses device. In some examples, glasses device 104 may be a helmet such as a motorcycle helmet, aviation helmet, sports helmet, combat or military helmet, etc.

In some examples, more than one system, such as system 100 and system 101, may be implemented in glasses device 104. System 101 may include an image processing unit 112, an augmented reality display 116, and/or at least one camera 118. System 100 and system 101 may each correspond to an eye of a user and thereby provide binocular vision. For example, system 100 may correspond to a right eye of a user and system 101 may correspond to a left eye of a user. In some examples, augmented reality display 114 and augmented reality display 116 may be separated by a distance based on a pupil distance of a user, such as 65 millimeters. In some examples, camera 118 and camera 120 may be separated by a distance based on a pupil distance of a user. In some examples, glasses device 104 may include one image processing unit configured to facilitate implementation of system 100 and system 101. One or more elements of systems 100, 101 may operate similarly.

Focusing on system 100 as illustrative of the operation and processing of both system 100 and system 101, image processing unit 110, augmented reality display 114, and/or camera 120 may be configured to be in communication with each other. Augmented reality display 114 may be a head mounted display such as a LCD display and/or a LED display, and may be configured to display contents such as images. Augmented reality display 114 may be configured to project light onto a retina of a user. In some examples, system 100 may be implemented to adjust a brightness of the projected light to enhance vision of the user in bright conditions and/or low-light conditions. The brightness of the displayed images may be increased or decreased to a target brightness level, or within a target brightness range based on a user preference. Camera 120 may include one or more lenses 122, 124. Lenses 122, 124 may facilitate focus of light through an aperture and onto an imaging sensor. Lenses 122, 124 may further facilitate protection of light filters inside the camera. Camera 120 may capture light reflected from an object 108 through lens 122 and/or lens 124. Lens 122 may include a clear filter such as an omnidirectional filter. The clear filter of lens 122 may transmit incoming light substantially nonselectively based on linear polarization qualities of the incoming light. Linear polarization qualities of the incoming light may include a particular polarizing angle in which the incoming light may be linearly polarized or vibrating. Lens 124 may include a polarized filter such as a unidirectional filter. The polarized filter of lens 124 may be configured to filter light captured by lens 124 at a respective linear polarizing angle or axis. The polarized filter of lens 124 may include elements with long-chain molecules aligned along the polarizing axis so that captured light vibrating along the polarizing axis may be substantially selectively absorbed by the elements. The transmitted light may be captured by an imaging sensor, such as a charge-coupled device (CCD), or a complementary metal oxide semiconductor (CMOS) sensor. Camera 120 may be configured to convert the captured light to one or more image data.

In an example, glasses device 104 may be in a form of eyeglasses. A user 102 may wear glasses device 104. Object 108 may be located in front of user 102. A light source 106 may produce light and direct light onto object 108. Light may contact object 108 and may be reflected in one or more directions. User 102 may use glasses device 104, such as by activating camera 120, to capture light reflected from object 108. Camera 120 may convert light captured through lens 122 into first image data 130. Camera 120 may convert light captured through lens 124 into second image data 132. Camera 120 may send first image data 130 and/or second image data 132 to image processing unit 110. First image data 130 and/or second image data 132 may each include pixel values, and may correspond to object 108. Image processing unit 110 may be configured to produce a first image 140 when first image data 130 is rendered on display 114. In an example where lens 122 includes a clear filter, first image data 130 may include data corresponding to a glare 150. First image data 130 may have a first intensity value that may correspond to a brightness of first image 140. In an example where lens 124 includes a polarized filter, second image data 132 may be a variation of first image data 130, such as a polarized variation. Image processing unit 110 may further be configured to produce a second image 142 when second image data 132 is rendered on display 114. Second image data 132 may have a second intensity value lower than the first intensity value of first image data 130, where the second intensity value may correspond to a brightness of the second image 142. Image processing unit 110 may be configured to render first image 140 and/or second image 142 on augmented reality display 114.

Image processing unit 110 may be configured to combine first image data 130 and second image data 132 to facilitate production of a modified image 146 as is described in more detail below. Modified image 146 may have reduced glare 150 compared with first image 140. For example, modified image 146 may have a third intensity value less than the first intensity value of first image data 130 and greater than the second intensity value of second image data 132, where the third intensity value may correspond to a brightness of the modified image 146. Image processing unit 110 may render modified image 148 on augmented reality display 114.

Figure 2:
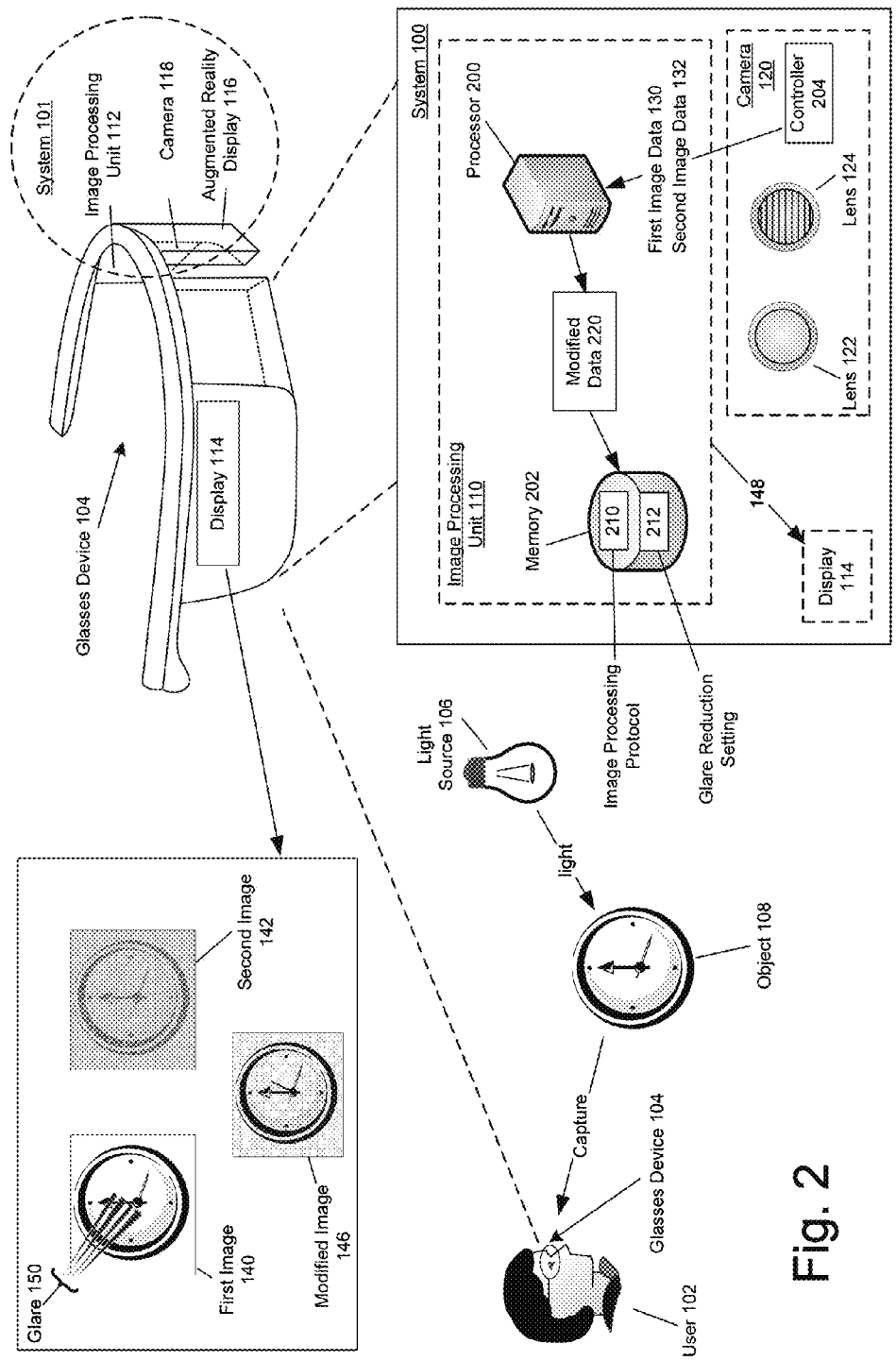
FIG. 2 illustrates the example system of FIG. 1 with additional details relating to an example with a clear filter.

FIG. 2 illustrates the example system of FIG. 1 with additional details relating to an example with a clear filter, arranged in accordance with at least some embodiments described herein. FIG. 2 is substantially similar to system 100 of FIG. 1, with additional details. Those components in FIG. 2 that are labeled identically to components of FIG. 1 will not be described again for the purposes of clarity.

Image processing unit 110 may include a processor 200 and/or a memory 202. Processor 200 may be configured to be in communication with memory 202 and/or a controller 204. Memory 202 may include an image processing protocol 210. Image processing protocol 210 may include instructions adapted to combine two or more images. Processor 200 may be configured to store and access data in memory 202. Processor 200 may be configured to render images on augmented reality display 114. Controller 204 may be configured to respectively associate first image data 130 and second image data 132 with lens 122 and lens 124. Controller 204 may be further configured to send first image data 130 and second image data 132 to processor 200.

In an example operation, processor 200 may receive first image data 130 and/or second image data 132 from camera 120. Processor 200 may store first image data 130 and second image data 132 in memory 202. Processor 200 may access and/or implement image processing protocol 210 to generate modified data 220. Generation of modified data 220 may include combining two or more sets of data, such as first image data 130 and/or second image data 132.

In some examples, memory 202 may further store a glare reduction setting 212. Glare reduction setting 212 may be a value such as an integer or decimal number. Processor 200 may be configured to preset and/or modify glare reduction setting 212 based on an input from user 102. For example, user 102 may provide an indication, such as a verbal command through a microphone or an input through a user interface such as buttons on glasses device 104, to command processor 200 to preset and/or modify glare reduction setting 212. Modification of glare reduction setting 212 may include increasing and/or decreasing a value that relates to a level of desired glare reduction.

For example, a glare reduction setting 212 of "1.0" may correspond to a moderate or default amount of glare reduction. A glare reduction setting 212 larger than "1.0" may correspond to a greater amount of glare reduction. A glare reduction setting 212 below "1.0" may correspond to a lower amount of glare reduction. A glare reduction setting 212 of "0.0" may correspond to no glare reduction. In some examples, a glare reduction setting 212 with a negative value may correspond to an exaggerated amount of glare or reflections being desired for modified image 146. An exaggerated amount of glare may facilitate amplifying a reflection visible on a reflective surface of object 108.

Each pixel intensity value in modified image 146 may be modified based on glare reduction setting 212, such as by applying the formula below:

$$I_{modified}(x,y) = I_{unfiltered}(x,y) - (glare\_reduction\_setting * I_{glare}(x,y))$$

The variables in this formula are defined as:

glare reduction setting may be glare reduction setting 212;

$I_{unfiltered}(x,y)$ may be a pixel intensity value of a pixel at coordinates (x,y) of image data that corresponds to light reflected from an object through a clear filter of a camera, where $I_{unfiltered}(x,y)$ may be observed through a clear filter by a camera at coordinates x and y;

$I_{glare}(x,y)$ may be calculated by subtracting a pixel intensity value of a pixel at coordinates (x,y) of image data that corresponds to light reflected from an object through a polarized filter of a camera from $I_{unfiltered}(x,y)$.

In an example, processor 200 may combine first image data 130 and second image data 132 by calculating $I_{modified}$ values at coordinates (x,y), and writing the $I_{modified}$ values to the corresponding (x,y) coordinates in modified data 220. In an example implementation that may be used to reduce glare in first image data 130 where the glare reduction setting 212 may be "0.5", if a pixel value positioned at coordinates $(x_1,y_1)$ in first image data 130 is "180" and a pixel value positioned at coordinates $(x_1,y_1)$ in second image data 132 is "140", processor 200 may calculate a value $I_{glare}(x_1,y_1)$ "40" by taking the difference between "180" and "140". Processor 200 may then multiply "0.5" by "40" to calculate a product of $I_{glare}(x_1,y_1)$ and glare reduction setting 212, resulting in an intermediary value of "20". Processor 200 may then subtract the intermediary value "20" from the value "180" positioned at coordinates $(x_1,y_1)$ in first image data 130, to calculate a value of "160" for $I_{modified}(x_1,y_1)$. Processor 200 may further write the value of "160" to coordinates $(x_1,y_1)$ of modified image 146. Processor 200 may continue to process a pixel in subsequent coordinates. Processor 200 may render modified data 220 on augmented reality display 114 to produce modified image 146, where modified image 146 may include a view of reduced glare 150 when compared to first image 140.

In some examples, processor 200 may combine first image data 130 and second image data 132 by respectively processing color channels of the first and second image data such as red, green, and/or blue in an RGB color space. In some examples, image data such as first image data 130 and second image data 132 may be represented in a non-RGB color space such as a multispectral color space.

In some examples, image data such as first image data 130 and second image data 132 may be represented in a color space such as HSV, YIQ, or YCbCr which may include non-luminance data. Such image data may be converted, such as by execution of instructions in image processing protocol 210 by processor 200, into luminance values by a color space conversion. For example, processor 200 may execute instructions in image processing protocol 210 to convert an image data from a YCbCr representation to a RGB representation. Conversion of image data may be performed by processor 200 prior to combination of image data. In some examples, processor 200 may be configured to combine first image data 130 and second image data 132 when first image data 130 is represented in a first color space and second image data 132 is represented in a second color space. For example, if first image data 130 is represented in grayscale, and second image data 132 is represented in the RGB color space, processor 200 may convert second image data 132 to a color space that decorrelates grayscale values from the second image data 132. Processor 200 may further combine the decorrelated grayscale values of image data 132 with first image data 130. Processor 200 may further write pixel values in the combined image data to corresponding coordinates of modified data 220. In another example, processor 200 may be configured to convert second image data 132 to the color space YIQ, before combining and storing a converted "Y" channel with first image data 130 represented in grayscale, and further write pixel values of the I and Q channels of the converted second image data 132 in corresponding positions of modified data 220. Processor 200 may be configured to combine first image data 130 and second image data 132 in an arbitrary color space and may perform operations such as addition and/or subtraction based on the color space representation of each image data.

Figure 3:
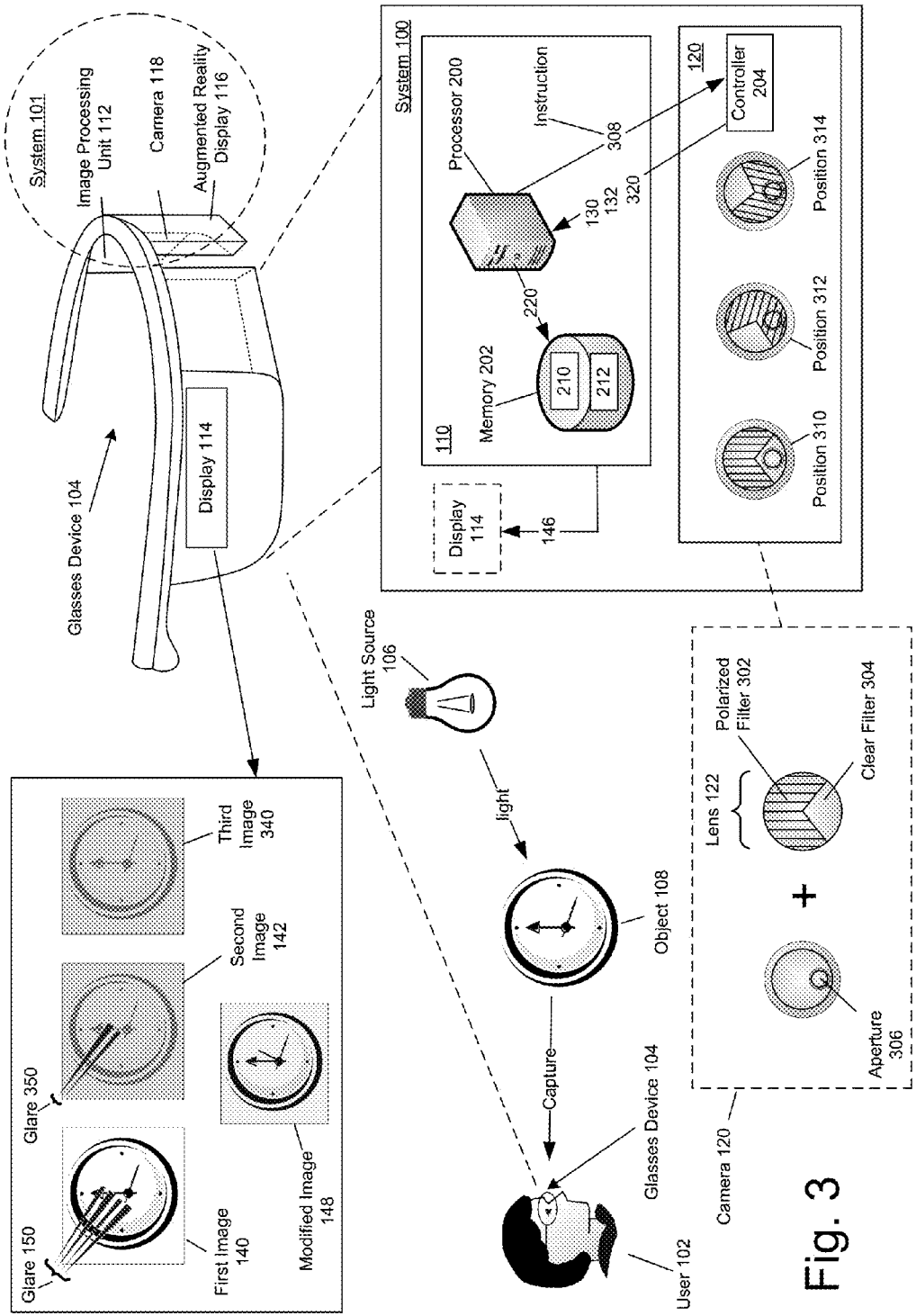
FIG. 3 illustrates an implementation of the example system of FIG. 1 with a rotatable lens including a clear filter.

FIG. 3 illustrates an implementation of the example system of FIG. 1 with a rotatable lens including a clear filter, arranged in accordance with at least some embodiments described herein. FIG. 3 is substantially similar to system 100 of FIG. 1, with additional details. Those components in FIG. 3 that are labeled identically to components of the preceding figures will not be described again for the purposes of clarity.

In some examples, camera 120 may further include an aperture 306. Lens 122 may be a rotatable lens. In an example, lens 122 may be inside of a rotor housing and lens 122 may be rotated along with the rotor housing. Controller 204 may be further configured to control camera 120 based on instructions generated by processor 200, as discussed in more detail below. Lens 122 may include a polarized filter 302 and a clear filter 304. Polarized filter 302 may be a unidirectional filter and clear filter 304 may be an omnidirectional filter. Lens 122 may be configured to rotate in one or both of two directions. Polarized filter 302 may rotate with lens 122 so that camera 120 may capture light at a different polarizing angle. Clear filter 304 may be of a size larger or equal to a size of aperture 306. In some examples, processor 200 may generate an instruction 308 to command lens 122 to rotate in a particular direction and/or angle value. In an example, lens 122 may be rotated at a speed fast enough so that first and second image data 130, 132 relates to the same image but slow enough to allow for sufficient light exposure on an imaging sensor of camera 120. Instruction 308 may include a rotation direction, an angle value, and/or a period. For example, instruction 308 may include commands such as "clockwise", "15 degrees", and/or "5 milliseconds". Processor 200 may send instruction 308 to controller 204. Controller 204 may receive instruction 308 and may execute instruction 308. In an example, lens 122 may rotate 15 degrees in the clockwise direction every 5 milliseconds in response to execution of instruction 308 by controller 204. Controller 204 may activate camera 120 every 5 milliseconds in response to receiving instruction 308.

In an example, starting an operation at zero milliseconds, lens 122 may be at a position 310. When lens 122 is at position 310, clear filter 304 may align with aperture 306. Controller 204 may activate camera 120 when lens 122 is at position 310 to capture light reflected from object 108. Controller 204 may convert light captured by camera 120 at position 310 into first image data 130. First image data 130 may include indications of glare 150. At a fifth millisecond, lens 122 may be rotated to a position 312. When lens 122 is at position 312, polarized filter 302 may align with aperture 306 at a first polarizing angle. Controller 204 may activate camera 120 when lens 122 is at position 312 to capture light reflected from object 108. Controller 204 may convert light captured by camera 120 at position 312 into second image data 132. Second image data 132 may include indications of a glare 350. At a tenth millisecond, lens 122 may be rotated to a position 314. When lens 122 is rotated to position 314, polarized filter 302 may align with aperture 306 at a second polarizing angle. Controller 204 may activate camera 120 when lens 122 is at position 314 to capture light reflected from object 108. Controller 204 may convert light captured by camera 120 at position 314 into third image data 320. Third image data 320 may include pixel values, and may correspond to object 108. Image processing unit 110 may be further configured to produce a third image 340 when third image data 320 is rendered on display 114. Controller 204 may send first image data 130, second image data 132 and/or third image data 320 to processor 200. First image data 130, second image data 132 and/or third image data 320 may be different from each other.

Processor 200 may store first image data 130, second image data 132 and/or third image data 320 in memory 202. Processor 200 may access and/or implement image processing protocol 210 in memory 202 to generate modified data 220 based on a combination of first image data 130, second image data 132 and/or third image data 320. Processor 200 may store modified data 220 in memory 202 and/or produce modified image 146 by rendering modified data 220 on augmented reality display 114. User 102 may view modified image 148 through augmented reality display 114. In some examples, glare intensity $I_{glare}(x,y)$ may be calculated by subtracting the minimum pixel intensity value at corresponding coordinates among second image data 132, third image data 320, and/or additional image data generated by camera 120. $I_{glare}(x,y)$ may be based on light captured at a respective position of lens 122 from corresponding $I_{unfiltered}(x,y)$ values of first image data 130.

In some examples, lens 122 may rotate in a discontinuous manner. Processor 200 may be configured to implement a feedback control system to adjust the polarizing angle of camera 120, such as by rotating lens 122, based on image data captured by camera 120. Processor 200 may generate instruction 308, based on an evaluation of glare 150, to command controller 204 to rotate lens 122 in a particular direction and/or to a particular polarizing angle. In an example, processor 200 may determine that intensity value of pixels relating to glare 150 may be too large. Processor 200 may generate instruction 308 to command controller 204 to rotate lens 122 to a polarizing angle such that polarized filter 302 will cover aperture 306 of camera 120 entirely, such as position 314. In another example, processor 200 may determine that intensity value of pixels relating to glare 150 may be too low. Processor 200 may generate instruction 308 to command controller 204 to rotate lens 122 to a polarizing angle such that clear filter 304 will cover aperture 306 of camera 120 entirely, such as position 310. In another example, processor 200 may analyze a difference between intensity values of pixels relating to glare 150 and/or glare 350 at each position or at least one subsequent positions of lens 122, and may generate instruction 308 based on the analysis. In some examples, system 100 may utilize a feedback loop to reduce and/or minimize glare 150.

Figure 4:
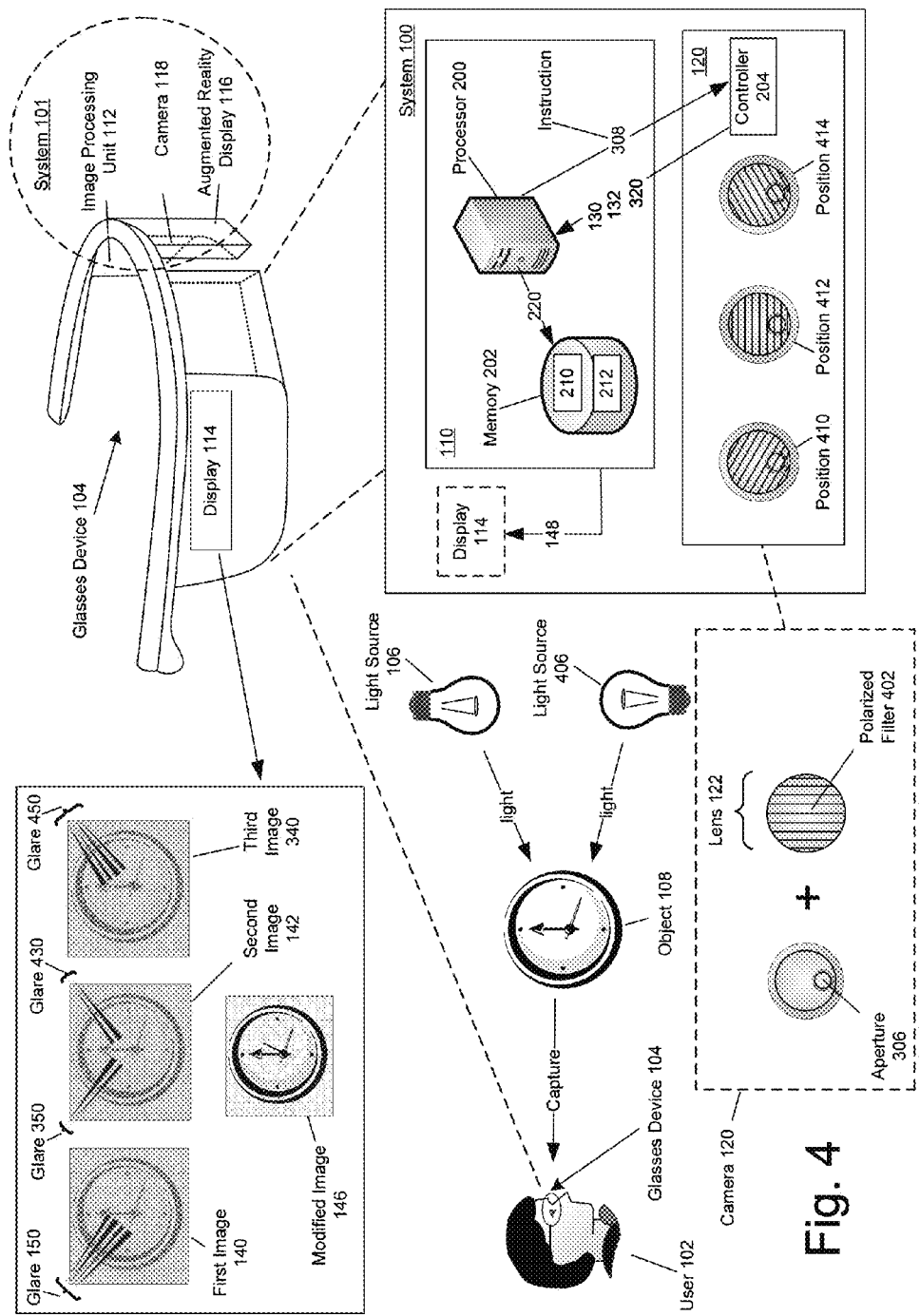
FIG. 4 illustrates an implementation of the example system of FIG. 1 with a rotatable lens excluding a clear filter.

FIG. 4 illustrates an implementation of the example system of FIG. 1 with a rotatable lens excluding a clear filter, arranged in accordance with at least some embodiments described herein. FIG. 4 is substantially similar to system 100 of FIG. 1, with additional details. Those components in FIG. 4 that are labeled identically to components of the preceding figures will not be described again for the purposes of clarity.

In some examples, camera 120 may include lens 122 and/or aperture 306. Lens 122 may be a rotatable lens. Lens 122 may include a polarized filter 402. Polarized filter 402 may be a unidirectional filter. Lens 122 may be configured to rotate in one or both of two directions. Polarized filter 402 may rotate with lens 122 so that camera 120 may capture light at a different polarizing angle. Polarized filter 402 and lens 122 may be of a same size. Polarized filter 402 may cover aperture 306.

First image data 130 may be captured by camera 120 when lens 122 is rotated to position 410. Second image data 132 may be captured by camera 120 when lens 122 is rotated to position 412. Third image data 320 may be captured by camera 120 when lens 122 is rotated to position 414. First image data 130, second image data 132, and/or third image data 320 may be respectively captured by camera 120 through rapid successive rotations of lens 122.

When camera 120 excludes a clear filter, processor 200 may calculate values for $I_{unfiltered}(x,y)$ based on selection of a maximum pixel intensity values at coordinates (x,y) among first image data 130, second image data 132, and/or third image data 320. For example, pixel intensity value at coordinates (x,y) in first image data 130 may be "180" and the pixel intensity value positioned at coordinates (x,y) in second image data 132 may be "168". Pixel intensity value positioned at coordinates (x,y) in third image data 320 may be "140". Processor 200 may compare pixel intensity values "180", "168", and "140". Processor 200 may select the largest pixel intensity value of the three pixel intensity values, which is "180". Processor 200 may write "180" to a corresponding $I_{unfiltered}(x,y)$. Processor 200 may continue to apply the aforementioned formula to determine values for $I_{modified}(x,y)$ at subsequent coordinates. A larger pixel value may correspond to a pixel with higher intensity or a brighter pixel.

In an example, an additional light source 406 may produce a glare such as glare 430 and/or glare 450. Third image data 320 may include indications of glare 450. Second image data 132 may include indications of glare 430. Glare 150 produced by first image data 130 may be replaced with glare 350 produced by second image data 132 based on a rotation of lens 122 from position 410 to position 412. Glare 350 produced by second image data 132 may be minimized and/or removed in third image data 320 based on a rotation of lens 122 from position 412 to position 414. Glare 450 produced by third image data 320 may be reduced to glare 430 produced by second image data 132 based on a rotation of lens 122 from position 414 to position 412. Glare 430 produced by second image data 132 may be minimized and/or removed in first image data 130 based on a rotation of lens 122 from position 412 to position 410.

In an example to calculate $I_{glare}(x,y)$, processor 200 may identify minimum values of first image data 130, second image data and/or third image data 320 at coordinates (x,y). Processor 200 may calculate $I_{glare}(x,y)$ values by subtracting the minimum values from corresponding $I_{unfiltered}(x,y)$ values. In some examples, lens 122 may be configured to rotate to more than three different positions and camera 120 may capture more than three image data. In some examples, each additional image data may facilitate further reduction of glare in an image of object 108. For example, glare 150 produced by first image data may be reduced to glare 350 produced by second image data when two image data are combined. Glare 350 may be further reduced when three image data are combined.

In some examples, processor 200 may combine first image data 130, second image data 132, and third image data 320 by comparing corresponding pixel values and selecting a smallest pixel value when calculating $I_{glare}(x,y)$. When glare reduction setting 212 is "1.0", processor 200 may write this smallest pixel value to the corresponding (x,y) coordinate in modified data 220.

For example, pixel intensity value positioned at coordinates (x,y) in first image data 130 may be "180", the pixel intensity value positioned at coordinates (x,y) in second image data 132 may be "168" and the pixel intensity value positioned at coordinates (x,y) in third image data 320 may be "140", processor 200 may compare pixel intensity values "180", "168", and "140". Processor 200 may select the smallest pixel intensity value of the three pixel intensity values, which is "140". Processor 200 may generate a $I_{glare}(x,y)$ value of "40" such as by subtracting the smallest pixel intensity value from $I_{unfiltered}(x,y)$. Processor 200 may determine $I_{modified}(x,y)$. For example, if glare reduction setting 212 is "0.5", processor 200 may calculate the value "160" to position (x,y) of modified data 200. Processor 200 may continue to compare corresponding pixel intensity values in first image data 130, second image data 132, and third image data 320, and calculate the modified pixel intensity values based on the comparison. A smallest pixel value may correspond to a pixel with lower intensity or a dimmer pixel. Modified image 146, produced based on selection of smallest pixel values, may include a reduced appearance of glare when modified image 148 is observed by a user such as user 102.

In some examples, glasses device 104 may further include a sensor such as a gyrometer or an accelerometer. Glasses device 104 may be worn on the head of user 102. As the head of user 102 moves, the gyrometer or accelerometer inside of glasses device 104 may detect movement of glasses device 104 and may collect data relating to the movement. Processor 200 may be configured to analyze data collected by gyrometer or accelerometer in glasses device 104. Processor 200 may generate instruction 308 based on the collected data and command controller 204 to rotate lens 122 in a particular direction and/or polarizing angle. For example, if a gyrometer indicates that a user has rolled his head "10 degrees", then the processor 200 may rotate lens 122 "10 degrees" in an opposite direction to attempt to keep the glare in the modified image 148 minimized. In another example, lens 122 may be rotated to keep lens 122 constant with respect to gravity (e.g., so that the polarization angle remains horizontal).

Figure 5:
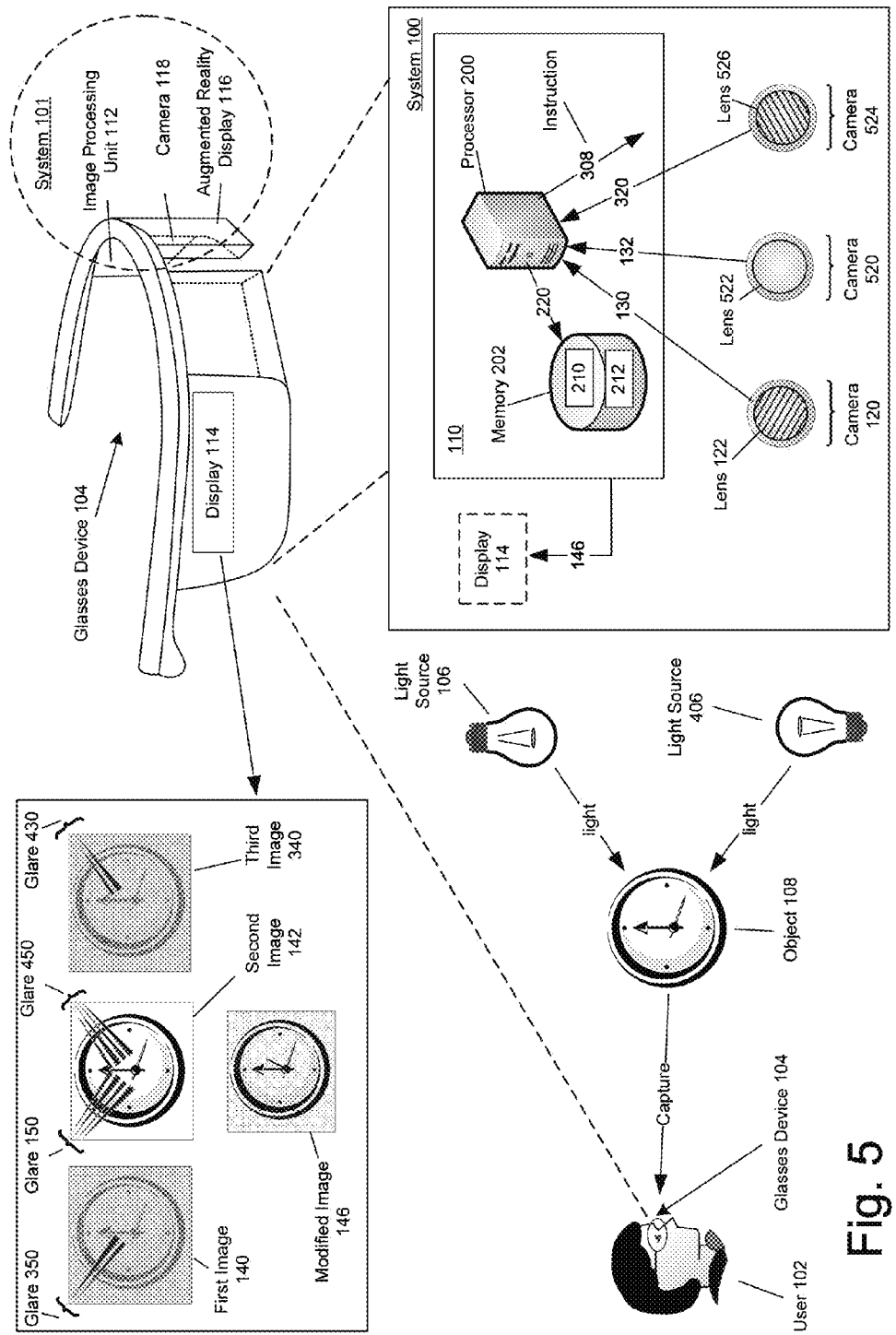
FIG. 5 illustrates an implementation of the example system of FIG. 1 with a camera including a clear filter and a camera including a polarized filter.

FIG. 5 illustrates an implementation of the example system of FIG. 1 with a camera including a clear filter and a camera including a polarized filter, arranged in accordance with at least some embodiments described here. FIG. 5 is substantially similar to system 100 of FIG. 1, with additional details. Those components in FIG. 5 that are labeled identically to components of the preceding figures will not be described again for the purposes of clarity.

In an example, system 100 may further include cameras 520, 524. A larger number of cameras may increase the potential to reduce glare. Cameras 120, 520, 524 may each be activated based on instructions, such as instruction 308, from processor 200. Cameras 520, 524 may respectively include lenses 522, 526 and may be in one or more housings. In an example, lens 122 of camera 120 may include a first polarized filter, such as a unidirectional filter, configured to a first polarizing angle. Lens 522 of camera 520 may include a clear filter such as an omnidirectional filter. Lens 526 of camera 524 may include a second polarized filter, such as a unidirectional filter, configured to a second polarizing angle. The first polarizing angle may be different from the second polarizing angle. Camera 120 may be configured to capture first image data 130 through lens 122. Camera 520 may be configured to capture second image data 132 through lens 522. Camera 524 may be configured to capture third image data 320 through lens 526.

In some examples, processor 200 may apply an affine or transformation to first image data 130, second image data 132, and/or third image data 320 to accommodate light captured at different location and/or angles or object 108 and/or light source 106, 406. Such affine or transformation may include performing shifting, rotating, and/or zooming functions on first image data 130, second image data 132, third image data 320 and/or additional image data.

Figure 6:
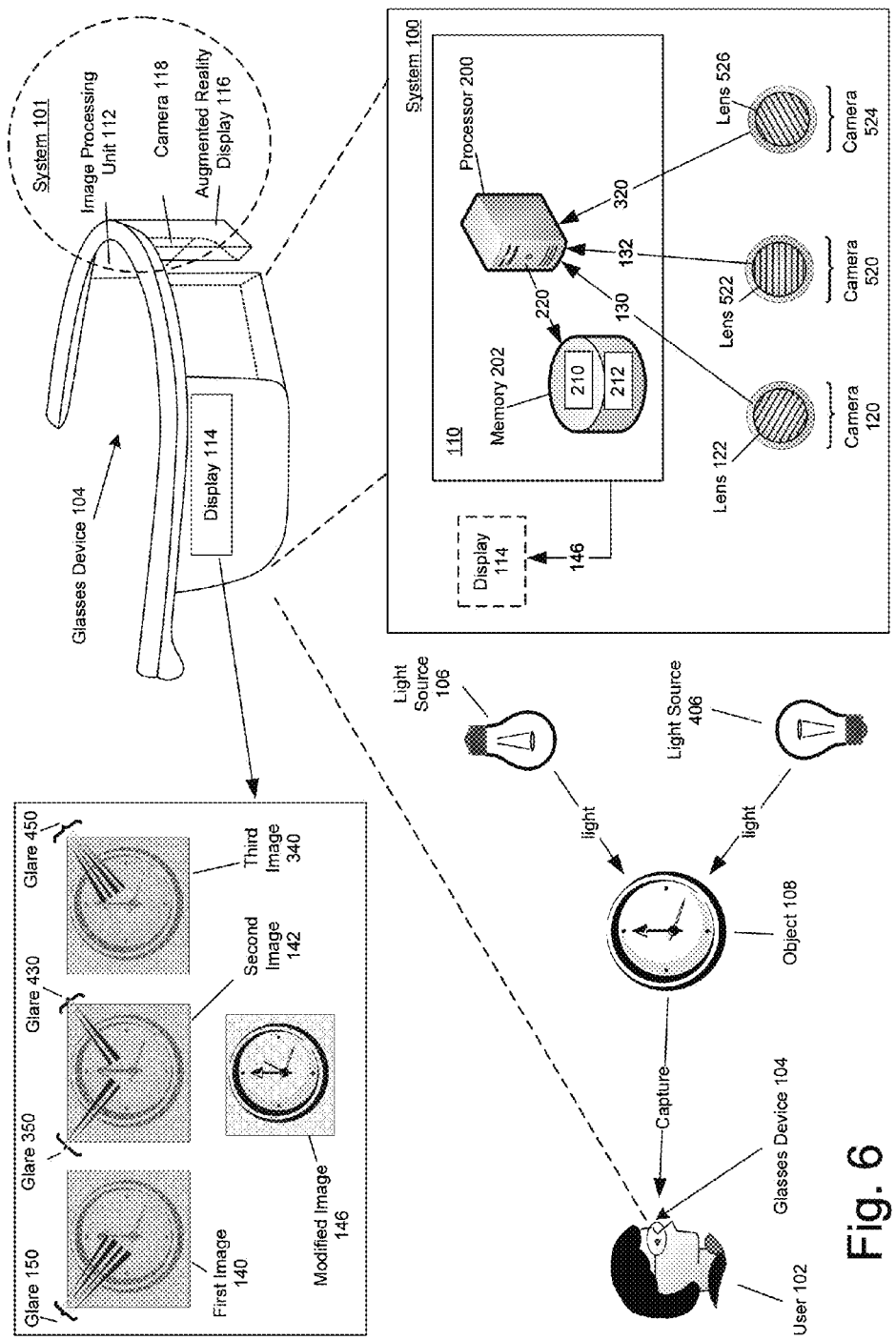
FIG. 6 illustrates an implementation of the example system of FIG. 1 with two or more cameras including respective polarized filters.

FIG. 6 illustrates an implementation of the example system of FIG. 1 with two or more cameras including respective polarized filters, arranged in accordance with at least some embodiments described here. FIG. 6 is substantially similar to system 100 of FIG. 1, with additional details. Those components in FIG. 6 that are labeled identically to components of the preceding figures will not be described again for the purposes of clarity.

In an example, lens 122 of camera 120 may include a first polarized filter, such as a unidirectional filter, configured to a first polarizing angle. Lens 522 of camera 520 may include a second polarized filter, such as a unidirectional filter, configured to a second polarizing angle. Lens 526 of camera 524 may include a third polarized filter, such as a unidirectional filter, configured to a third polarizing angle. The first, second, and third polarizing angle may be different from each other. Camera 120 may be configured to capture light reflected from object 108 to generate first image data 130 through lens 122. Camera 520 may be configured to capture light reflected from object 108 to generate second image data 132 through lens 522. Camera 524 may be configured to capture light reflected from object 108 to generate third image data 320 through lens 526.

When system 100 excludes a camera including a lens with a clear filter, processor 200 may calculate values for $I_{unfiltered}(x,y)$ based on selection of a maximum pixel intensity values at coordinates (x,y) among first image data 130, second image data 132, and/or third image data 320. Processor 200 may further identify minimum values of first image data 130, second image data 132, and/or third image data 320 at coordinates (x,y). Processor 200 may calculate $I_{glare}(x,y)$ values by subtracting the minimum values from corresponding $I_{unfiltered}(x,y)$ values. Each additional image data may facilitate further reduction of glare in an image of object 108. In some examples, an equal distribution of minimum pixel intensity values among pixels in first image data 130, second image data 132, and third image data 320 may be selected by processor 200 to calculate corresponding $I_{glare}$ values.

Among other possible benefits, a system in accordance with the disclosure may benefit users who encounter glare when viewing objects. For example, a driver operating a vehicle may encounter glare in a view of the road such as glare generated by the sun, water, snow, and/or lights from other vehicles. Reduction of glare may allow the driver to operate the vehicle in a safe manner. In another example, a user viewing a mobile device such as a cell phone may benefit from reduction of glare. Mobile devices may include screens that reflect light, such as light from the sun, or other light sources. Glare can be reduced while limiting attenuation of overall light.

A system in accordance with the disclosure may reduce glare produced by light reflected from vertical and/or horizontal surfaces of an object, and/or where a light source emitting the light may be positioned at different location or angles. Two or more polarization angles may be selected. In some examples, an equal distribution of angles may be selected, such as where the angle increment is calculated by 180 degrees divided by the number of uniquely polarized filters. For example, for 2 uniquely-polarized filters, 0 degrees and 90 degrees (calculated by: 0 degrees+(180/2) degrees) could be selected. Other options include: 0, 60, and 120 degrees; 30, 90, and 150 degrees; 0, 45, 90, and 135 degrees; 0, 30, 60, 90, 120, and 150 degrees; 0, 22.5, 45, 67.5, 90, 112.5, 145, and 167.5 degrees, and so on.

A system in accordance with the disclosure may minimize glare reflected off bodies of standing water. When a user is in a body of standing water, polarized filters configured to filter light at a polarizing angle in proximity to a horizontal orientation, such as "0 degree", may be desirable in order to block light vibrating vertically while permitting passage of light vibrating horizontally.

A system in accordance with the disclosure may also diminish areas of glare in an image, while permitting undiminished or less substantially diminished soft polarized reflections to be visible to a user. Such a task may be accomplished by processing image data based on whether the amount of glare exceeds a maximum allowed intensity. The maximum allowed intensity may be stored in memory 202. For example, the following formula may be used to accomplished such a task (where: max( . . . ) means taking the maximum value of the inputs):

$$I_{modified}(x,y) = I_{unfiltered}(x,y) - \max(0, (I_{glare}(x,y) - \text{max\_glare\_allowable}))$$

If $I_{glare}(x,y)$ is less than max_glare_allowable, an original value of $I_{unfiltered}(x,y)$ may be written to $I_{modified}(x,y)$ and may be visible to the user. If $I_{glare}(x,y)$ exceeds max_glare_allowable, the portion that exceeds the maximum may be subtracted from $I_{unfiltered}[x,y]$ and the difference may be written to $I_{modified}(x\ y)$ and may be visible to the user. The maximum allowed glare intensity (e.g., max_glare_allowable) may be preset and/or modified similarly to glare reduction setting 212.

Glare reduction setting 212 may be applied to the maximum allowed glare intensity, such as by using the following formula:

$$I_{modified}(x,y) = I_{unfiltered}(x,y) - \text{glare\_reduction\_setting} *$$
$$(\max(0, (I_{glare}(x,y) - \text{max\_glare\_allowable})))$$

Figure 7:
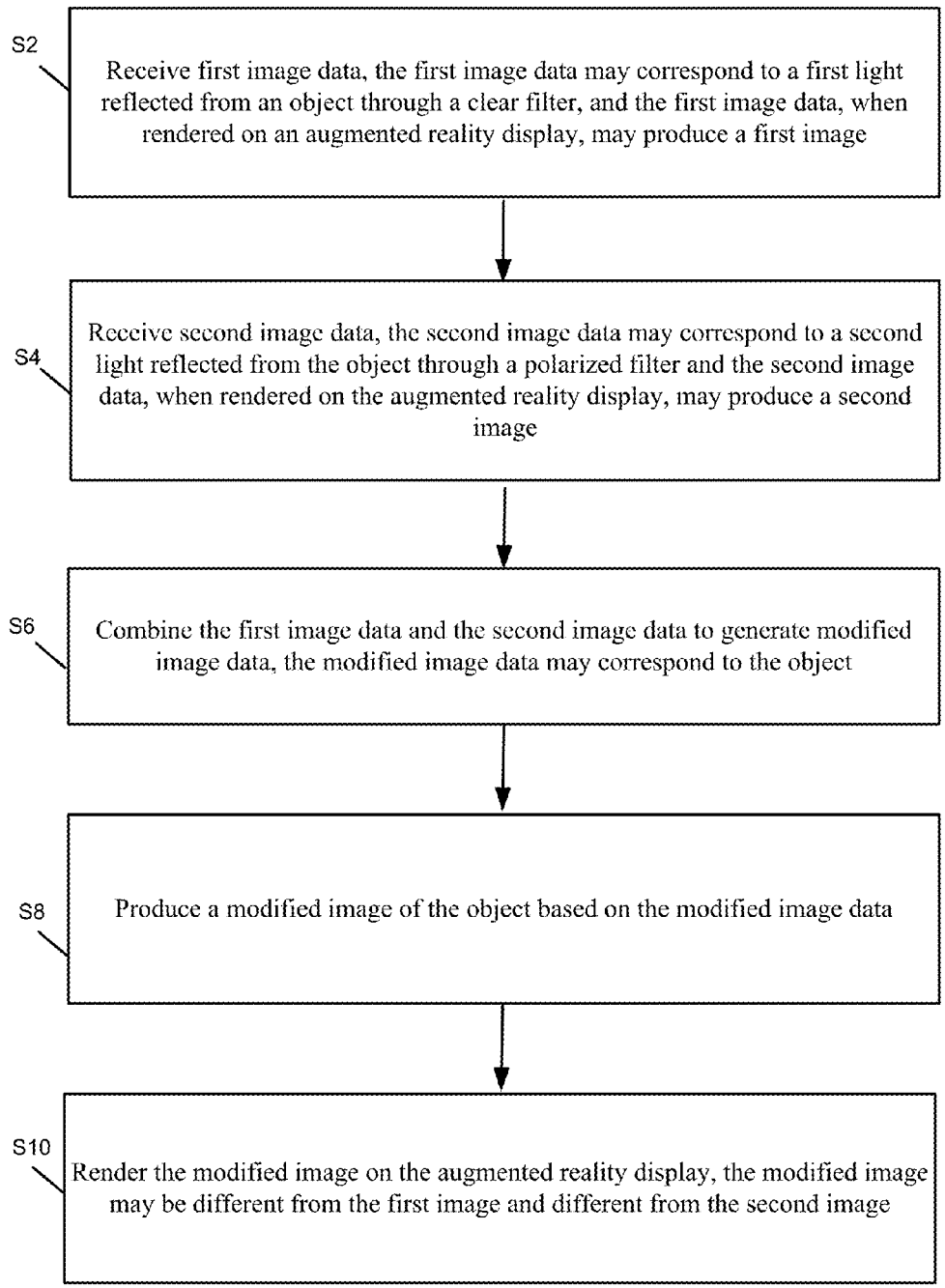
FIG. 7 illustrates a flow diagram for an example process for implementing reduction of glare in augmented reality.

FIG. 7 illustrates a flow diagram for an example process for implementing reduction of glare in augmented reality arranged in accordance with at least some embodiments presented herein. The process in FIG. 7 could be implemented using, for example, system 100 discussed above. An example process may include one or more operations, actions, or functions as illustrated by one or more of blocks S2, S4, S6, S8 and/or S10. Although illustrated as discrete blocks, various blocks may be divided into additional blocks, combined into fewer blocks, or eliminated, depending on the desired implementation.

Processing may begin at block S2, "Receive first image data, the first image data may correspond to a first light reflected from an object through a clear filter, and the first image data, when rendered on an augmented reality display, may produce a first image." At block S2, a processor may receive first image data. The first image data may correspond to a first light reflected from an object through a clear filter. The first image data, when rendered on an augmented reality display, may produce a first image. A camera may capture the first image data prior to receiving the first image data at the processor. The first image data may include data that corresponds to a glare.

Processing may continue from block S2 to block S4, "Receive second image data, the second image data may correspond to a second light reflected from the object through a polarized filter and the second image data, when rendered on the augmented reality display, may produce a second image." At block S4, the processor may receive second image data. The second image data may correspond to light reflected from the object through a polarized filter. The second image data, when rendered on the augmented reality display, may produce a second image. A camera may capture the second image data prior to receiving the second image data at the processor.

Processing may continue from block S4 to block S6, "Combine the first image data and the second image data to generate modified image data, the modified image data may correspond to the object." The processor may combine the first image data and the second image data to generate modified image data. The modified image data may correspond to the object.

Processing may continue from block S6 to block S8, "Produce a modified image of the object based on the modified image data." The processor may produce a modified image of the object based on the modified image data.

Processing may continue from block S8 to block S10, "Render the modified image on the augmented reality display, the modified image may be different from the first image and different from the second image." The processor may render the modified image on the augmented reality display. The modified image may be different from the first image and different from the second image. The modified image data may include data that corresponds to a reduction of the glare compared with the first image data. The modified image may include less intensity than the second image.

The processor may combine the first image data and the second image data by identifying a first set of pixels in the first image data and identifying a second set of pixels in the second image data. In an example, the processor may calculate a difference between the first set of pixels and the second set of pixels. In an example, the processor may select larger pixel values from the first and second set of pixels. In an example, the processor may select smaller pixel values from the first and second set of pixels.

In an example, the processor may rotate a lens with the clear filter and with the polarized filter to a first position. When the lens is in the first position, the clear filter of the lens may be aligned with an aperture of a camera. When the lens is in the first position, the camera may capture the first image data. The processor may rotate the lens with the clear filter and with the polarized filter to a second position. When the lens is in the second position, the polarized filter of the lens may be aligned with the aperture of the camera. When the lens is in the second position, the camera may capture the second image data. The clear filter may be equal to or larger in size than the aperture of the camera.

In an example, the first image data may be captured by a first camera. The first camera may include a first lens. The first lens may include a clear filter. The second image data may be captured by a second camera. The second camera may include a second lens. The second lens may include a polarized filter.

FIG. 8 illustrates an example computer program product 800 that can be utilized to implement reduction of glare in augmented reality, arranged in accordance with at least some embodiments described herein. Program product 800 may include a signal bearing medium 802. Signal bearing medium 802 may include one or more instructions 804 that, when executed by, for example, a processor, may provide the functionality described above with respect to FIGS. 1-7. Thus, for example, referring to system 100, processor 200 in glasses device 104 may undertake one or more of the blocks shown in FIG. 7 in response to instructions 804 conveyed to the system 100 by medium 802.

In some implementations, signal bearing medium 802 may encompass a computer-readable medium 806, such as, but not limited to, a hard disk drive, a Compact Disc (CD), a Digital Video Disk (DVD), a digital tape, memory, etc. In some implementations, signal bearing medium 802 may encompass a recordable medium 808, such as, but not limited to, memory, read/write (R/W) CDs, R/W DVDs, etc. In some implementations, signal bearing medium 802 may encompass a communications medium 810, such as, but not limited to, a digital and/or an analog communication medium (e.g., a fiber optic cable, a waveguide, a wired communications link, a wireless communication link, etc.). Thus, for example, program product 800 may be conveyed to one or more modules of the system 100 by an RF signal bearing medium 802, where the signal bearing medium 802 is conveyed by a wireless communications medium 810 (e.g., a wireless communications medium conforming with the IEEE 802.11 standard).

FIG. 9 is a block diagram illustrating an example computing device 900 that is arranged to implement reduction of glare in augmented reality, arranged in accordance with at least some embodiments described herein. In a very basic configuration 902, computing device 900 typically includes one or more processors 904 and a system memory 906. A memory bus 908 may be used for communicating between processor 904 and system memory 906.

Depending on the desired configuration, processor 904 may be of any type including but not limited to a microprocessor (µP), a microcontroller (µC), a digital signal processor (DSP), or any combination thereof. Processor 904 may include one more levels of caching, such as a level one cache 910 and a level two cache 912, a processor core 914, and registers 916. An example processor core 914 may include an arithmetic logic unit (ALU), a floating point unit (FPU), a digital signal processing core (DSP Core), or any combination thereof. An example memory controller 918 may also be used with processor 904, or in some implementations memory controller 918 may be an internal part of processor 904.

In some examples, instructions executed by processor 904 may be optimized for computational and/or power efficiency. For example, instead of multiplying an unsigned integer pixel value by the floating point number "0.5", a rightward bitwise shift operation (>>) may be substituted to produce a substantially equivalent result with improved performance. As another example, a multiplication may be skipped entirely if it is by certain "special" numbers, such as "1.0" or "0.0". As another example, if no glare reduction is desired (e.g., if the glare reduction setting 212 is "0.0"), processor 200 may write a calculated $I_{unfiltered}(x,y)$ value selected based on largest pixel value from a set of uniquely-polarized input images to position (x,y) of modified data 220. Modified image 146, produced based on selection of largest pixel values, may be similar to an image captured by a camera with a clear filter.

As yet another example, the order of operations for steps performed by the processes may be altered to allow for additional optimization, such as by streamlining a process that is executed repeatedly.

Depending on the desired configuration, system memory 906 may be of any type including but not limited to volatile memory (such as RAM), non-volatile memory (such as ROM, flash memory, etc.) or any combination thereof. System memory 906 may include an operating system 920, one or more applications 922, and program data 924. Application 922 may include a glare reduction protocol 926 that is arranged to perform the functions as described herein including those described with respect to system 100 of FIGS. 1-6. Program data 924 may include glare reduction data 928 that may be useful for implementation of reduce glare in augmented reality repeater as is described herein. In some embodiments, application 922 may be arranged to operate with program data 924 on operating system 920 such that reduction of glare in augmented reality may be provided. This described basic configuration 902 is illustrated in FIG. 9 by those components within the inner dashed line. Computing device 900 may have additional features or functionality, and additional interfaces to facilitate communications between basic configuration 902 and any required devices and interfaces. For example, a bus/interface controller 930 may be used to facilitate communications between basic configuration 902 and one or more data storage devices 932 via a storage interface bus 934. Data storage devices 932 may be removable storage devices 936, non-removable storage devices 938, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

System memory 906, removable storage devices 936 and non-removable storage devices 938 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 900. Any such computer storage media may be part of computing device 900.

Computing device 900 may also include an interface bus 940 for facilitating communication from various interface devices (e.g., output devices 942, peripheral interfaces 944, and communication devices 946) to basic configuration 902 via bus/interface controller 930. Example output devices 942 include a graphics processing unit 948 and an audio processing unit 950, which may be configured to communicate to various external devices such as a display or speakers via one or more A/V ports 952. Example peripheral interfaces 944 include a serial interface controller 954 or a parallel interface controller 956, which may be configured to communicate with external devices such as input devices (e.g., keyboard, mouse, pen, voice input device, touch input device, etc.) or other peripheral devices (e.g., printer, scanner, etc.) via one or more I/O ports 958. An example communication device 946 includes a network controller 960, which may be arranged to facilitate communications with one or more other computing devices 962 over a network communication link via one or more communication ports 964.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 900 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to produce a modified image of an object, the method comprising, by a processor:
    generating a first instruction to rotate a lens including a clear filter and a polarized filter to a first position such that the clear filter of the lens is aligned with an aperture of a camera;
    receiving first image data from the camera, wherein the first image data is captured by the camera when the lens is at the first position, and the first image data corresponds to a first light reflected from the object through the clear filter, and wherein the first image data, when rendered on an augmented reality display, produces a first image that corresponds to the object;
    generating a second instruction to rotate the lens to a second position such that the polarized filter of the lens is aligned with the aperture of the camera;
    receiving second image data from the camera, wherein the second image data is captured by the camera when the lens is at the second position, and the second image data corresponds to a second light reflected from the object through the polarized filter, and wherein the second image data, when rendered on the augmented reality display, produces a second image that corresponds to the object;
    combining the first image data and the second image data to generate modified image data, wherein the modified image data corresponds to the object;
    producing the modified image of the object based on the modified image data; and
    rendering the modified image on the augmented reality display, wherein the modified image is different from the first image and different from the second image.

2. The method of claim 1 further comprising capturing the first image data and second image data by the camera.

3. The method of claim 1, wherein the clear filter is equal to or larger in size than the aperture of the camera.

4. The method of claim 1, wherein combining the first image data and the second image data comprises:
    identifying a first set of pixels in the first image data;
    identifying a second set of pixels in the second image data; and
    calculating a difference between the first set of pixels and the second set of pixels.

5. The method of claim 1, wherein combining first image data and the second image data comprises:
    identifying a first set of pixels in the first image data;
    identifying a second set of pixels in the second image data; and selecting larger pixel values from the first and second set of pixels.

6. The method of claim 1, wherein combining the first image data and the second image data comprises:
identifying a first set of pixels in the first image data;
identifying a second set of pixels in the second image data; and
selecting smaller pixel values from the first and second set of pixels.

7. The method of claim 1, wherein:
the first image data includes data that corresponds to a glare; and
the modified image data includes data that corresponds to a reduction of the glare compared with the first image data.

8. The method of claim 1, wherein the modified image has less intensity than the first image.

9. A device effective to produce a modified image of an object, the device comprising:
a memory that includes instructions;
an augmented reality display;
a processor configured to be in communication with the memory and the augmented reality display, the processor effective to:
generate a first rotation instruction to rotate a lens comprising a clear filter and a polarized filter to a first position such that the clear filter of the lens is aligned with an aperture of a camera;
receive first image data from the camera, wherein the first image data is captured by the camera when the lens is at the first position, and the first image data corresponds to a first light reflected from the object through the clear filter, and wherein the first image data, when rendered on the augmented reality display, produces a first image that corresponds to the object;
store the first image data in the memory;
generate a second rotation instruction to rotate the lens to a second position such that the polarized filter of the lens is aligned with the aperture of the camera;
receive second image data from the camera, wherein the second image data is captured by the camera when the lens is at the second position, and the second image data corresponds to a second light reflected from the object through the polarized filter, and wherein the second image data, when rendered on the augmented reality display, produces a second image that corresponds to the object;
store the second image data in the memory;
combine, with use of the instructions, the first image data and the second image data to generate modified image data, wherein the modified image data corresponds to the object;
produce the modified image of the object based on the modified image data; and
render the modified image on the augmented reality display, wherein the modified image is different from the first image and different from the second image.

10. The device of claim 9, wherein the processor is further effective to:
identify a first set of pixels in the first image data;
identify a second set of pixels in the second image data; and
calculate a difference between the first set of pixels and the second set of pixels.

11. The device of claim 9, wherein the processor is further effective to:
identify a first set of pixels in the first image data;
identify a second set of pixels in the second image data; and
select larger pixel values from the first and second set of pixels.

12. The device of claim 9, wherein the processor is further effective to:
identify a first set of pixels in the first image data;
identify a second set of pixels in the second image data; and
select smaller pixel values from the first and second set of pixels.

13. The device of claim 9, wherein the modified image has less intensity than the first image.

14. The device of claim 9, wherein the processor is further effective to produce the modified image on an augmented reality glasses device.

15. An augmented reality glasses device effective to produce a modified image of an object, the augmented reality glasses device comprising:
a camera that includes a lens comprising a clear filter and a polarized filter;
a memory that includes instructions;
an augmented reality display; and
a processor configured to be in communication with the camera, the memory and the augmented reality display, the processor effective to:
generate a first instruction to rotate the lens to a first position such that the clear filter of the lens is aligned with an aperture of the camera;
receive first image data from the camera, wherein the first image data is captured by the camera when the lens is at the first position, and the first image data corresponds to a first light reflected from the object, wherein the first image data is received by the camera through the clear filter, and wherein the first image data, when rendered on an augmented reality display, produces a first image that corresponds to the object;
store the first image data in the memory;
generate a second instruction to rotate the lens to a second position such that the polarized filter of the lens is aligned with the aperture of the camera;
receive second image data from the camera, wherein the second image data is captured by the camera when the lens is at the second position, and the second image data corresponds to a second light reflected from the object, wherein the second image data is received by the camera through the polarized filter, and wherein the second image data, when rendered on the augmented reality display, produces a second image that corresponds to the object;
store the second image data in the memory;
combine, with use of the instructions, the first image data and the second image data to generate modified image data, wherein the modified image data corresponds to the object;
produce the modified image of the object based on the modified image data; and
render the modified image on the augmented reality display, wherein the modified image is different from the first image and different from the second image.

16. The augmented reality glasses device of claim 15, wherein the clear filter is equal to or larger in size than the aperture of the camera.

17. The augmented reality glasses device of claim 15, wherein the processor is effective to combine the first image data and the second image data by:
identification of a first set of pixels in the first image data;
identification of a second set of pixels in the second image data; and calculation of a difference between the first set of pixels and the second set of pixels.

18. The augmented reality glasses device of claim 15, wherein the processor is effective to combine the first image data and the second image data by:
- identification of a first set of pixels in the first image data;
- identification of a second set of pixels in the second image data; and
- selection of larger pixel values from the first and second set of pixels.

19. The augmented reality glasses device of claim 15, wherein the processor is effective to combine the first image data and the second image data by:
- identification of a first set of pixels in the first image data;
- identification of a second set of pixels in the second image data; and
- selection of smaller pixel values from the first and second set of pixels.

20. The augmented reality glasses device of claim 15, wherein:
- the first image data includes data that corresponds to a glare; and
- the modified image data includes data that corresponds to a reduction of the glare compared with the first image data.

21. The augmented reality glasses device of claim 15, wherein the modified image has less intensity than the first image.

\* \* \* \* \*

UNITED STATES PATENT AND TRADEMARK OFFICE
CERTIFICATE OF CORRECTION

PATENT NO. : 9,237,274 B2  
APPLICATION NO. : 14/364017  
DATED : January 12, 2016  
INVENTOR(S) : Russell It is certified that error appears in the above-identified patent and that said Letters Patent is hereby corrected as shown below:

Specification

In Column 1, Line 5, delete "APPLICATIONS" and insert -- APPLICATION --, therefor.

In Column 1, Line 8, delete "§371" and insert -- § 371 --, therefor.

In Column 10, Lines 13-14, delete "second image data" and insert -- second image data 132, --, therefor.

In Column 10, Line 45, delete "calculate the value" and insert -- calculate and write the value --, therefor.

Signed and Sealed this  
Twenty-sixth Day of April, 2016

Michelle K. Lee  
*Director of the United States Patent and Trademark Office*